United States Patent

[11] 3,599,850

[72] Inventor Ernest M. Whitley
    Palo Alto, Calif.
[21] Appl. No. 782,132
[22] Filed Dec. 9, 1968
[45] Patented Aug. 17, 1971
[73] Assignee Red Lake Laboratories
    Santa Clara, Calif.

[54] MOTION PICTURE FILM-ADVANCING MECHANISM
    12 Claims, 9 Drawing Figs.
[52] U.S. Cl. .................................................. 226/56,
    226/57, 226/69, 352/191
[51] Int. Cl. ..................................................... G03b 1/22
[50] Field of Search ........................................... 226/62-
    —66, 156, 57; 352/192, 193, 191

[56] References Cited
    UNITED STATES PATENTS
| | | | |
|---|---|---|---|
| 2,218,763 | 10/1940 | Mery | 352/192 |
| 2,986,316 | 5/1961 | Petersen | 226/62 X |
| 3,454,334 | 7/1969 | Campbell | 352/191 |

Primary Examiner—Allen N. Knowles
Assistant Examiner—Gene A. Church
Attorney—Schapp and Hatch ABSTRACT: A motion picture film-advancing mechanism for advancing film having sprocket holes therein in stop-and-go fashion through a film gate for exposure or projection comprising a film-advancing finger means carried on spaced cranks for movement in a circular path for engaging the film and advancing it intermittently in a cyclic action, and a register pin carried for axial movement in a mounting block and having an eccentric drive for moving the register pin intermittently into engagement with the film sprocket holes for holding the film when the finger is retracted, said register pin drive and finger drive mechanism being synchronized through a common gear train and forming for a high-speed operation; the improvements including pivotally carrying the register pin mounting block and providing an eccentric adjustment screw for adjusting the pivot of the block and providing fine adjustment of the register pin to obtain accurate adjustment of the spacing between the register pin and finger, providing a lost motion drive for the register pin whereby the register pin may be retracted while the finger is in a retracted position, and providing means for eliminating play and backlash including a pressure bearing member on a ball bearing mounting for the retractable fingers.

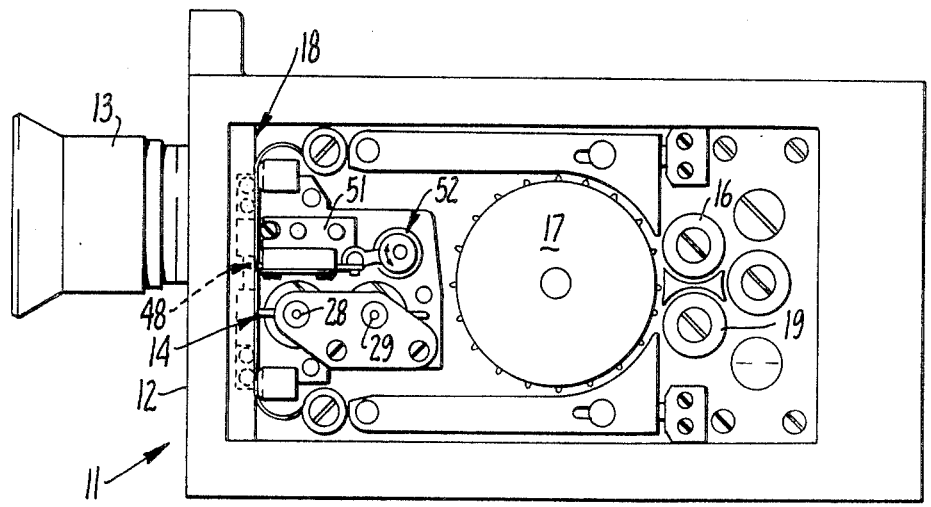
FIG. 1.
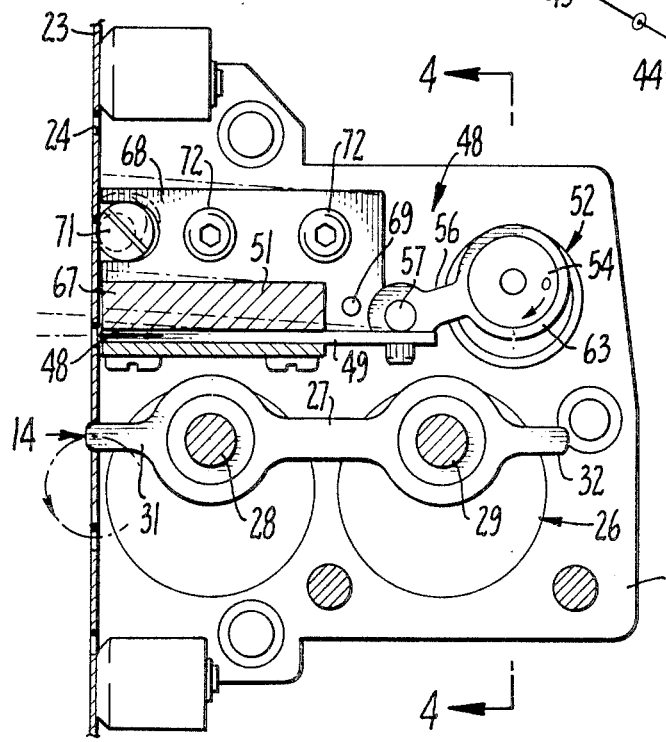
FIG. 3.
FIG. 2.
INVENTOR.
ERNEST M. WHITLEY
BY
Schapp & Hatch
ATTORNEYS INVENTOR.
ERNEST M. WHITLEY
BY
Schapp & Hatch
ATTORNEYS

MOTION PICTURE FILM-ADVANCING MECHANISM

BACKGROUND OF THE INVENTION

This invention relates to improvements in a motion picture film-advancing mechanism, and more particularly to improvements in a film transport apparatus having a claw or finger mechanism for intermittently advancing film.

Heretofore, high-speed motion picture cameras in which the film is advanced intermittently, one frame at a time, have been beset by many difficulties and problems. One of the major problems with such high-speed intermittent motion picture cameras is the physical limitations of the various parts used, i.e., most of the assembled parts of such high-speed cameras tend to fly apart at speeds in excess of a few hundred frames per second. This physical limitation has dictated the maximum number of frames which can be taken with a camera per second. In addition to the speed limitations imposed upon the assembled parts of these cameras, the mechanical intricacies of the construction of such cameras impose operational limitations. The parts must be synchronized in all respects so that the film is advanced exactly one frame at a time and is held against movement to permit a picture to be taken when the film is not being advanced. To start, stop and hold the film stationary while the film is exposed several hundred times a second involves exact synchronization which heretofore has been difficult to accomplish without making such cameras unduly expensive.

In cameras of the type described, a claw or finger is often employed to pull down the film one frame at a time, the claw or finer being driven rapidly to enter successively into a series of holes in the film for advancing the latter. The cameras heretofore known to the industry have employed complex gear trains for driving and synchronizing the operation of the film advancing claws or fingers. A very slight amount of wear on these gears creates backlash and runout problems which result in high shock loads, binding and failure of the bearings used for supporting the claws or fingers. Therefore, it is desirable to provide a film transport mechanism capable of rapid stop-and-go operation in reliable synchronization, which contains a minimum of moving parts.

Another problem that has been encountered in film transport mechanisms resides in the fact that the spacing between holes in a given strip of film will vary slightly from one strip to another. In fact, the spacing varies somewhat in the same film due to shrinkage on aging and the like. Such slight variations cause the mechanism to bind somewhat and thereby run less smoothly or cause damage to the film strip or both.

SUMMARY OF THE INVENTION

Certain of the problems accompanying film transport mechanisms having gear drives are eliminated in the film transport apparatus of this invention by employing a crank member and link system wherein cranks connected to one link are offset or out of phase from cranks connected to another link of the system, thereby preventing any overcenter binding, preferably this offset is about 90°.

One feature of the invention resides in means for moving the register pin so that its position of engagement may be varied accurately and in fine adjustment with respect to the claw or finger utilized to intermittently move the film strip. In its preferred form, this adjustment is achieved by providing the register pin in a pivoted mounting so that pivoting of the mounting will cause a change in position of the end of the register pin at its engagement with the film strip. The fine adjustment in this preferred form is best obtained by utilizing an eccentric adjustment screw to accurately adjust the pivot of the register pin mounting block.

In addition to the adjustment means on the register pin, it is preferred to include a manually operable lost motion device in the drive mechanism for the pin to facilitate loading of the film and adjustment of the pin. However, the lost motion device is locked out during regular operation.

Another feature of the invention, which is incorporated in the preferred form thereof, resides in the use of a special ball bearing construction. This ball bearing construction has the usual inner and outer raceway members and balls separating them in combination with a lateral thrust member formed to slidingly bear against the rotating raceway members and provide an operative ball bearing contact angle adjusted from the vertical. In this way, better tracking is achieved.

It will be appreciated, that these improved features may be utilized either singly or together in combination with known components in order to provide an improvement thereover and thereby allow higher speeds to be obtained than heretofore achieved in a reliable manner.

It is therefore a principal object of the present invention to provide a compact, fully synchronized and relatively inexpensive camera in which the film is intermittently advanced past an aperture one frame at a time at the rate of several hundred frames per second or higher.

Another object of this invention is the provision of a high-speed camera of the class described in which the film is securely held in a stationary position between advancing movements so that clear unblurred pictures may be taken.

A further object of the present invention is the provision of a high-speed camera such as described in which the distance between the film-advancing mechanism and the film-holding mechanism may be adjusted to compensate for minute variations in the distance between sprocket holes in different strips or rolls of film.

A still further object of this invention is the provision of a manually operative lost motion device in the drive means for the film-holding mechanism to facilitate the loading of the film and the adjusting of the transport mechanism.

Still another object of the present invention is the provision of a high-speed motion picture camera in which the advancing mechanism is constructed in such a manner as to eliminate vibration and harmonic problems at very high operating speeds.

Further objects and advantages of the invention will be apparent as the specification progresses, and the new and useful features of the motion picture film-advancing mechanism will be more fully defined in the claims attached hereto.

BRIEF DESCRIPTION OF THE DRAWINGS

The preferred form of the invention is illustrated in the accompanying drawings, in which:

FIG. 1 is a side elevation of a camera constructed according to the invention with certain of the parts being removed to illustrate the structure of the film transport mechanism incorporated therein;

FIG. 2, an enlarged vertical fragmentary view of a portion of the camera shown in fIG. 1 illustrating the film transport mechanism as it is mounted therein;

FIG. 3, a schematic layout of the drive trains utilized in the preferred film transport mechanism of this invention;

Figure 4:
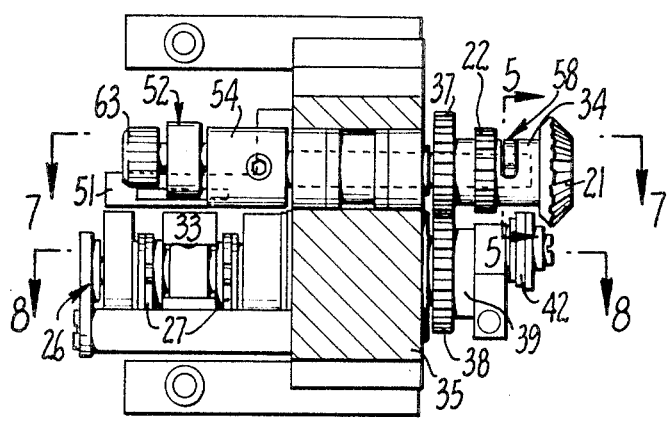
FIG. 4, a vertical sectional view taken substantially in the plane of line 4–4 of FIG. 2.

While only the preferred form of the invention is shown, it should be understood that various changes and modifications may be made within the scope of the claims hereto attached without departing from the spirit of the invention.

DESCRIPTION OF THE PREFERRED EMBODIMENT

Referring to the drawing in greater detail and more particularly to FIG. 1, there is shown a high-speed motion picture camera 11 comprising a housing 12, a lens system 13 appropriately mounted thereon, and a film advancing mechanism 14 for moving the film in stop and go fashion through an exposure position. Certain of the usual portions of the camera are not shown, but the improvement is especially suitable for use in the camera shown in the U.S. Pat. No. 3,454,344 issued July 8, 1969 by Rouel R. Campbell entitled Film Transport Apparatus. It will be appreciated, however, that this film-advancing mechanism will be suitable in other high-speed camera constructions, and, also that this film-advancing mechanism may be utilized to advance film through a movie projector. In such cases, the advantages of the improved high-speed operation of the film-advancing mechanism of this invention may be utilized.

Referring again to FIG. 1, the film will move from a supply spool and suitable associated means (not shown) around roller 16, against a portion of sprocket 17, through a film guide and gate mechanism 18, back against the sprocket 17, around roller 19, and finally back to a takeup spool (not shown). The sprocket 17 is driven in synchronous fashion with a drive gear 21, which drives the film-advancing mechanism 14. Drive gear 21 also has gear 22 coupled thereto, and gear 22 serves to drive the shutter mechanism. In this way, all of the various driven elements are driven in synchronous relation, and a complete description of a typical synchronized drive system is shown in the Campbell application cited above.

The film-advancing means or mechanism 14 is formed to handle a strip of film 23 having a series of sprocket holes 24 evenly spaced along a side thereof (see FIG. 3). As there shown, a typical film strip 23 is equipped with sprocket holes on both sides in accordance with conventional construction. The film is advanced through film guide 18, which guides the film through a typical aperture in a film gate for exposure thereof.

The film advancing means 14 for intermittently advancing the film 23 past the aperture, includes a carrier 26 composed of two plates 27 spaced apart from one another by shafts 28 and 29. Each plate 27 has a finger 31 extending from the forward end thereof adapted to be inserted in adjacent holes along one side of the film. A rearwardly extending finger 32 is provided on each plate 27 for balancing the latter. Counterweights 33 are connected to shafts 28 and 29 between plates 27 (see FIG. 3). The plates are adapted to be driven in a circular motion to cause the fingers 31 to enter into a hole on each side of the film strip in the series of holes on opposite sides of the film and pull the latter down a predetermined distance before being withdrawn from the holes.

The drive for the carrier 26 includes the drive gear 21, which is carried on a hollow shaft 34. The hollow shaft is mounted on a shaft 36 which is journaled in subassembly block 35. Gear 37 is carried on the hollow shaft 34 as well as the gear 22, so that gears 21, 22 and 37 all rotate at the same time with the shaft 34. Gear 38, which is driven by gear 37, is mounted on shaft 39, which is also journaled into subassembly block 35. A crank 41 connects gear 38 with a link 42, the opposite end of which is eccentrically connected by crank 43 to a shaft 44 rotatably mounted in the block 35.

Shafts 39 and 44 are connected to carrier shafts 28 and 29 by cranks 46 and 47, which cranks extend at a 90° angle relative to the arms of cranks 41 and 43, i.e., the cranks 46 and 47 are 90° out of phase with respect to the rotation of cranks 41 and 43. As set forth previously, the provision of the substantially 90° offset between cranks 41, 43 and cranks 46, 47 prevents any binding of the drive mechanism, thereby eliminating binding as a cause of failure. In other words, either link 42 or plates 27 will always be out of a dead center position so that gear 38 will drive the plates continuously and exert sufficient driving torque on shaft 44 when rotating shaft 39.

The registration pin means 48 for holding the film against longitudinal movement when the fingers 31 are not advancing the film is also adapted to be driven by gear 21. The registration pin means 48 includes a U-shaped pin 49, the outer ends of which are adapted to be inserted into two holes on opposite sides of the film (see FIGS. 2, 3 and 7). The pin 49 rides on tracks or guides formed in block 51.

Figure 5:
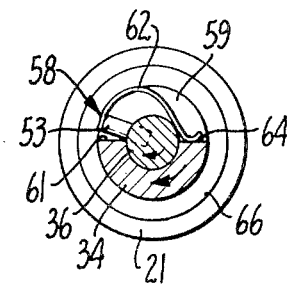
FIG. 5, a sectional view taken substantially in the plane of line 5–5 of FIG. 4.

The pin 49 is reciprocated toward and away from the film 23 by a registration pin drive system 52 which includes the shaft 36 driven by gear 21 through the hollow shaft 34 and a pin 53 (see FIG. 5). One end of the shaft 36 is connected to a crank or eccentric 54 adjacent its other end (see FIGS. 2 and 7).

A connecting rod 56 is connected to the eccentric portion of crank 54 and extends toward registration pin 49 where it is connected to the pin through a wrist pin 57. It will be seen that registration pin 49 is reciprocated toward and away from the film 23 by means of eccentric crank 54 when the shaft 36 is driven by gear 21.

In order to assist in loading the film-advancing mechanism, a manually operable lost motion device is placed in the drive system for the registration pin. With this device, the film-engaging members may be retracted by bringing the fingers 31 into a retracted position, and then manually retracting the registration pin.

Figure 6:
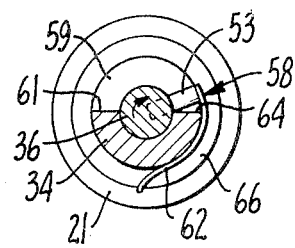
FIG. 6, a view similar to that shown in FIG. 5, but illustrating an alternate position of the mechanism shown therein.

Referring more particularly to FIGS. 4 through 6, the lost motion device 58 comprises a slot 59 in the hollow shaft 34 having a shoulder 61 formed for abutting contact between the pin 53 fixed to shaft 36 and hollow shaft 34. During normal driving operation, the hollow shaft 34 is moved in the direction indicated by the arrows in FIGS. 5, bringing shoulder 61 against pin 53, and causing shaft 36 to rotate in the same direction and at the same angular speed as shaft 34. In order to maintain this normal driving operation in stable condition and prevent chattering, a leaf spring 62 is provided as shown in FIG. 5 to urge the pin 53 against shoulder 61.

When it is desired to rotate the shaft 36 and bring the registration pin out of its normal synchronized relation with the finger, the operator rotates knob 63 while the main drive mechanism is held in stationary position so as to cause spring 63 to override its abutment at shoulder 64 and ride into an annular space 66 provided in the hollow shaft for receiving this spring (see FIG. 6). With the film in place, the operator will rotate knob 63 in reverse to bring the registration pins back into the proper position and place the drive system back into driving operation. In doing so, the operator will line up the film strip so that the registration pin will fit into the sprocket holes.

Figure 7:
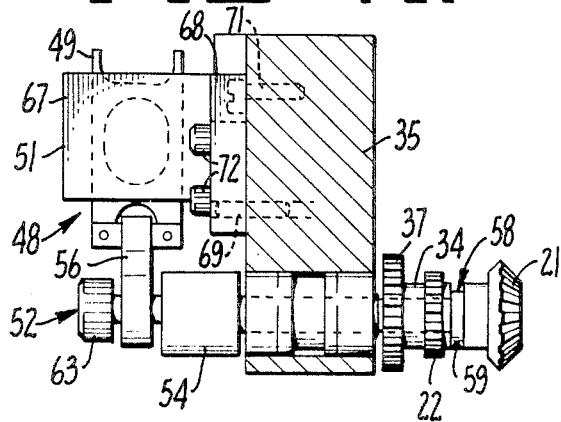
FIG. 7, a horizontal sectional view taken substantially in the plane of line 7–7 of FIG. 4, FIG. 8, a horizontal view taken substantially in the plane of line 8–8 of FIG. 4.

In order to insure that the registration pin 49 and fingers 31 will enter into the film at exactly into their proper holes at opposite sides of the film, the block 51 is made adjustable with respect to the subassembly block 35. As best seen in FIGS. 4 and 7, the block 51 is generally L-shaped and is formed with the main section 67 through which the registration pin is carried and a flanged section 68 having attaching means thereto for adjustably attaching the block 51 to subassembly block 35.

The attaching means comprises a pivotal connection through pivot fastening means 69 and eccentric adjustment screw 71 (see FIGS. 2 and 7). Auxiliary bolts 72 are provided, each of which have play so as to allow pivoting, but assists in restraining the block 51 from axial movement away from block 35, and provide for locking the block in adjusted position.

Accordingly, the adjusting means allows block 51 to be tilted or cocked slightly (see FIG. 2 for an exaggerated tilt) so that the points of entry into and exit from the holes in the side of the film may be moved slightly in a vertical direction. In this way, extremely accurate spacing between the registration pin 49 and fingers 31 is provided so that minor variation in the distance between holes such as is caused by film shrinkage can be accommodated so as to assure smooth high-speed operation without injury to the film.

Figure 9:
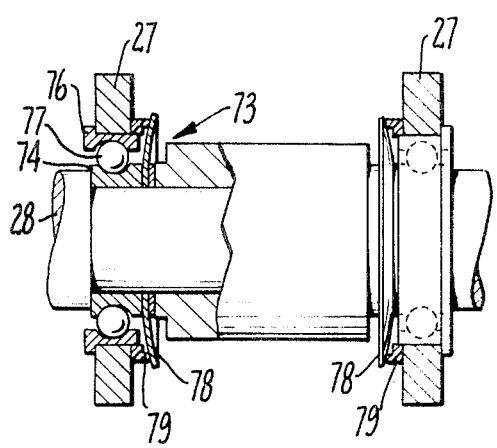
FIG. 9, a sectional view taken substantially in the plane of line 9–9 of FIG. 8.
Figure 8:
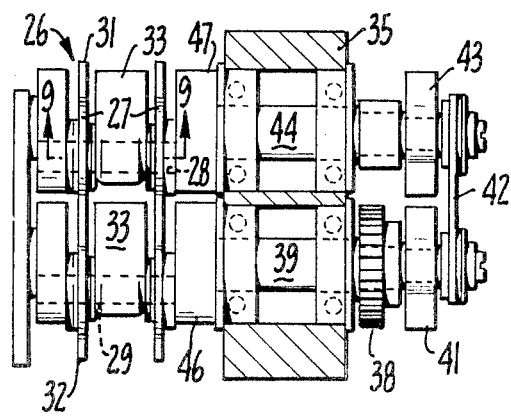

Another feature of the invention is the provision of special bearings, which assures the desired tightness and thereby assures proper tracking. It is important to provide these special bearings for the relative rotation of the plates 27 around the shafts 28 and 29 in the claw or finger mechanism. However, it will be appreciated that similar bearing constructions are also preferably provided for the bearings at link 42, and may be provided for the bearings around shaft 39 and 44, if desired. As here shown, a special bearing construction 73 is utilized on each of shafts 28 and 33 for providing relative rotational motion between the shafts and the plate 27. FIG. 9 shows the shaft 28 together with its associated ball bearing construction 73.

As illustrated in FIG. 9, the bearing 73 is a conventional ball bearing having inner race member 74 and outer race member 76 equipped with a plurality of balls 77 fitting in the tracks or raceways of the race members. As in the conventional bearing structure, the inner and outer race members rotate relatively to one another around the rotating balls 77.

Since the rotational speeds are extremely high in operation, precision ball bearings should be utilized with minimum clearances and such bearings are available on the market, having been developed for the gyroscope and other high-speed mechanisms. However, the special bearing member 73 also contains a springlike washer 78 disposed on one side of each bearing assembly; there being a bearing for each plate 27 as shown in FIG. 9. Between the outer race and the springlike washer 78, is a thrust bearing 79 made of Teflon or the like and capable of providing a low-friction sliding surface. As here shown, the thrust bearing is connected to and rotates with the outer race. The washer is in the configuration of a relatively flat truncated conic surface, and fabricated from an elastic metal.

It will be appreciated that the force of thrust is quite minimal, and only sufficient to prevent any slack from existing in the bearing member. With this thrust being minimal, the actual force of friction is very low and excessive heat and wear at the sliding surface is thereby avoided.

The advantage of this special bearing structure resides in the fact that the ball and race members are provided with an actual contact axis slightly away from the vertical, and the balls track better in this position than they do in vertically opposed positions in the race members.

In operation, the film is threaded into the camera by opening the film gate in the conventional manner and inserting the film therein. However, the operator brings the claws or fingers into a retracted position by rotating the takeup reel so as to provide this position of the claw. Then the operator retracts the register pin by rotating knob 63 and forcing the spring out of position as explained above. The film is lined up, and the claw mechanism brought around in a position as shown in fIG. 2. The register pin then is reset by turning knob 63 back so as to reset the spring and couple in the lost motion device. This will bring the film, register pin and claw substantially in the position shown in FIG. 2.

The operator then notices to see if the register pin is going to insert dead center in its corresponding hole with the claw positioned within a hole. If the register pin is in perfect alignment, nothing need be done. However, if the register pin is even slightly off center, the operator turns eccentric adjusting screw 71, which in turn rotates the block 51 and lines up the register pin so as to achieve perfect alignment. Holding screws 72 may be loosened and tightened, if desired, to facilitate adjustment and lock the pivot in the adjusted position. With the film thus accurately aligned with the film-advancing mechanism, the mechanism is ready to operate in accordance with the invention.

It will be appreciated, that with the excellent alignment achieved, and the minimum of drive gears utilized as herein shown together with the bearing construction shown, that the film advancing mechanism is capable of operating at extremely high speeds without injury to the film.

I claim:

1. Apparatus for advancing a strip of film having a series of holes therein, comprising
   a film-engaging finger formed for selective engagement in the holes,
   means for moving said finger to effect selective engagement of said finger with said holes and move the film strip a desired increment during each such engagement,
   a register pin formed for selective engagement in the holes,
   means for mounting the register pin for axial movement therethrough into and out of engagement with said film strip,
   means for moving said register pin in axial movement to effect selective engagement of said register pin with said holes to hold the film strip during each such engagement,
   said means for moving said finger and said means for moving said register pin being synchronized so that only one of the two moved elements is engaged in the holes at a given time, and
   means for adjusting position of the means for mounting the register pin to adjust the distance between the engagement position of the register pin and the engagement position of the finger.

2. The apparatus for advancing a strip of film defined in claim 1, in which the means for mounting the register pin is a mounting block, and in which the means for moving said register pin includes an eccentric driven in synchronized relation to the means for moving said film-engaging finger.

3. The apparatus for advancing a strip of film defined in claim 2, in which the register pin mounting block is pivotally mounted, and the means for adjusting the register pin includes an eccentric adjusting screw for accurately adjusting the degree of pivot of the mounting block.

4. The apparatus for advancing a strip of film defined in claim 1, in which a lost motion coupling is provided in the register pin drive means whereby the register pin drive may be manually turned in reverse to retract the register pin from engagement in the film while said finger is also in a disengaged position.

5. The apparatus for advancing a strip of film defined in claim 4, in which spring means are provided for ordinarily holding the lost motion coupling against rearward motion, said spring being biased in a manner such that manual operation can override the spring.

6. An apparatus for advancing a strip of film having sprocket holes along its length, comprising
   a film-engaging finger means formed for selective engagement of the sprocket holes,
   spaced cranks of equal throw connected to said finger means and formed for moving the latter in a circular path to effect said selective engagement of said finger means with the sprocket holes and move the film strip a desired increment during each engagement,
   drive means for rotating said cranks,
   a link connected to said cranks and formed for maintaining the throws of said cranks in parallelism as they rotate whereby such finger means is oriented parallel to itself at all positions around said circular path,
   a register pin formed for selective engagement in the sprocket holes,
   means for mounting the register pin for axial movement therethrough into and out of engagement with said film strip,
   a crank drive means operatively connected to said register pin for providing said axial movement thereof,
   said spaced cranks connected to said finger and said crank drive means for operating the register pin being directly driven from a common drive means whereby the finger and register pin are synchronized so that only one of said moving elements is engaged in a sprocket hole at a given time, and
   means for adjusting the register pin to adjust the distance between the engagement position of the register pin and the engagement position of the finger.

7. The apparatus for advancing a strip of film defined in claim 6, in which the register pin mounting block is pivotally mounted, and the means for adjusting the register pin includes an eccentric adjusting screw for accurately adjusting the degree of pivot of the mounting block.

8. The apparatus for advancing a strip of film defined in claim 7, in which the register pin is formed with two film engagement elements constructed to engage sprocket holes on each side of the film, and in which the film-engaging finger means has two and only two finger elements disposed to engage sprocket holes on each side of the film.

9. The apparatus for advancing a strip of film defined in 7, in which a lost motion coupling is provided in the register pin drive means whereby the register pin drive may be manually turned in reverse to retract the register pin from engagement in the film while said finger is also in a disengaged position.

10. The apparatus for advancing a strip of film defined in claim 9, in which spring means are provided for ordinarily holding the lost motion coupling against rearward motion, said spring being biased in a manner such that manual operation can override the spring.

11. An apparatus for advancing a strip of film having sprocket holes along its length, comprising
a film-engaging finger means formed for selective engagement of the sprocket holes,
spaced cranks of equal throw connected to said finger means and formed for moving the latter in a circular path to effect said selective engagement of said finger means with the sprocket holes and move the film strip a desired increment during each such engagement,
drive means for rotating said cranks,
said finger means being connected to said cranks through ball bearing assemblies,
each of said ball bearing assembly having an inner and outer race with balls disposed therebetween,
a thrust bearing on the rotating race, and a resilient pressure member adjacent the thrust bearing and formed to urge the rotating race in an axial direction,
a register pin formed for selective engagement in the sprocket holes,
means for mounting the register pin for axial movement therethrough into and out of engagement with said film strip,
a crank drive means operatively connected to said register pin for providing said axial movement thereof,
said spaced cranks connected to said finger and said crank drive means for operating the register pin being directly driven from a common drive means whereby the finger and register pin are synchronized so that only one of said moving elements is engaged in a sprocket hole at a given time, and
means for adjusting the register pin to adjust the distance between the engagement position of the register pin and the engagement position of the finger.

12. The apparatus for advancing a strip of film defined in claim 11, in which the resilient pressure member is a washer having the configuration of a relatively flat truncated conic surface and formed of material having high elasticity.